United States Patent
Blanton

[19]

[11] Patent Number: 5,964,495
[45] Date of Patent: Oct. 12, 1999

[54] FIFTH WHEEL VALLEY AND TRUCK BED COVER APPARATUS

[76] Inventor: Sammy C. Blanton, 4314 Pioneer Way, Dunsmuir, Calif. 96025

[21] Appl. No.: 08/918,183

[22] Filed: Aug. 21, 1997

Related U.S. Application Data

[63] Continuation-in-part of application No. 29/054,335, May 9, 1996.

[51] Int. Cl.⁶ ..................................................... B60P 7/02
[52] U.S. Cl. .................................... 296/100.02; 296/37.6; 280/901
[58] Field of Search .................................. 296/37.6, 24.1, 296/100.02; 280/901, 446.1, 441.1, 434

[56] References Cited

U.S. PATENT DOCUMENTS

| | | |
|---|---|---|
| 4,216,990 | 8/1980 | Musgrove et al. . |
| 4,685,695 | 8/1987 | Le Vee . |
| 4,832,359 | 5/1989 | Rafi-Zadeh . |
| 5,056,856 | 10/1991 | Pederson . |
| 5,239,934 | 8/1993 | Miller et al. . |
| 5,303,947 | 4/1994 | Gerber . |
| 5,329,979 | 7/1994 | Miller et al. . |
| 5,482,308 | 1/1996 | Marcu . |
| 5,575,494 | 11/1996 | De Vries . |
| 5,593,201 | 1/1997 | Bateman .............................. 296/100.02 |

Primary Examiner—D. Glenn Dayoan
Assistant Examiner—Jason Morrow
Attorney, Agent, or Firm—John P. O'Banion

[57] ABSTRACT

A removable pickup truck bed cover for use with pickup trucks having a fifth wheel attachment mounted on the bed which comprises a tapered wheel valley located within a ramp and a recess which houses a fifth wheel when the bed cover is fitted onto the truck bed. The wheel valley and ramp have an open end located adjacent the opening at the rear of the bed. The wheel valley extends forward and terminates at the recess and facilitates engagement of a king pin or the like on a trailer by receiving the king pin or the like at the open end and slidably guiding the mechanism forward, using the sides of the wheel valley as boundaries, to the recess for engagement with the fifth wheel. The ramp is inclined upward from the opening to the recess which further aids with the engagement of the fifth wheel. The bed cover incorporates a number of storage compartments with lids, a lockable rear door for access to the truck bed and a removable sliding tray located under the ramp.

15 Claims, 3 Drawing Sheets

FIG. −2

FIFTH WHEEL VALLEY AND TRUCK BED COVER APPARATUS

CROSS-REFERENCE TO RELATED APPLICATIONS

This application is a continuation-in-part of copending application Ser. No. 29/054,335 filed on May 9, 1996, which is incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to a pickup truck bed cover for use with pickup trucks having a fifth wheel attachment mounted on the bed, and more particularly to a tapered ramp and wheel valley on the truck bed cover that facilitates engagement of a king pin or like attachment means to the fifth wheel.

2. Description of the Background Art

Mounting a king pin or like attachment means from a trailer onto a fifth wheel hitching mount located on a pickup truck bed can be a difficult and time consuming process. For example, when the truck is being backed up to the trailer, the driver of the truck cannot see the trailer's king pin or attachment means because it is obscured by the vehicle. Unless there is another person providing directional assistance to the driver, the driver must guess the direction and distance to backup. This often results in inadvertent contact between the king pin or attachment means and the truck bed or truck bed cover resulting potential damage to the items involved.

The problem is further complicated by the driver having to guess the correct height of the king pin or like attachment means prior to backing the truck under the trailer. Improper height can result in inadvertent contact between the truck bed or truck bed cover and the king pin or like attachment means, and resulting damage to the affection sections. The correct height can vary with the grade on which the truck and trailer are positioned.

Thus, to avoid any mishaps, the driver may have to exit the truck several times during the alignment and engagement procedure to obtain a better view of the situation and take corrective measures as he proceeds. This obviously causes the process to be more difficult and time consuming than necessary.

Numerous truck bed covers have been developed, but none facilitate horizontal and vertical alignment and engagement of a king pin or like attachment means to a fifth wheel mounted on the bed of a pickup truck. For example, some truck bed covers incorporate a slot or tunnel which extends continuously from the fifth wheel to the opening at the rear of the truck bed, thus allowing a narrow path within which the king pin or like attachment means passes through towards the fifth wheel as the truck backs up to the trailer. While this type of design provides the driver some alignment assistance on the horizontal plane, the design is not completely effective. There are other designs which attempt to solve this problem by tapering the side walls of the slot or tunnel from top to bottom, thereby further reducing the margin of error during horizontal alignment, but the problem of alignment on the vertical plane still exists.

Accordingly, there exists a need for a pickup truck bed cover that facilitates the alignment and engagement of a king pin or like attachment means by assisting the driver in horizontally and vertically aligning the king pin or like attachment means and reducing the margin of error involved during the procedure.

The present invention addresses these needs, as well as other needs and offers advantages over the prior art and solves the problems associated therewith.

BRIEF SUMMARY OF THE INVENTION

The present invention provides a truck bed cover for use in pickup trucks having a fifth wheel attached onto the bed of the truck. The invention generally comprises a lightweight cover assembly which fits securely into a truck bed over the fifth wheel, a recess, a wheel valley, a ramp, and a plurality of storage compartments. The recess is located generally at the center of the bed and provides access to the fifth wheel. The wheel valley extends longitudinally from the recess to the rear of the bed terminating in an opening sized to receive a king pin or like attachment means from a trailer. Both the recess and the wheel valley are located within the ramp which extends longitudinally from the center of the bed to the rear of the bed.

The wheel valley is tapered from the recess to the opening, i.e. front to back whereby the side surfaces of the wheel valley serve as alignment guides for a king pin or like attachment means moving through the wheel valley toward the recess for engagement with the fifth wheel. The ramp and wheel valley are inclined upward from the opening to the recess, i.e. back to front, which further aids in the engagement of the king pin or like attachment means to the fifth wheel, especially with regards to vertical alignment. The side surfaces of the wheel valley and side walls of ramp are tapered from top to bottom, which aids horizontal alignment.

The angle of the ramp and height of the recess relative to the fifth wheel are selected such that engagement can be accomplished simply by aligning the wheel valley opening with the king pin or like attachment means and backing up the truck until the king pin or like attachment means engages the fifth wheel. The coupling can then be secured and locked. Removal simply requires unlocking the coupling and driving the truck forward, thus disengaging the fifth wheel from the king pin or like attachment means. The tapered side surfaces of the wheel valley from the front to the back serve to guide the king pin or like attachment means to the opening and prevents the king pin or like attachment means from striking and damaging the truck bed assembly.

The storage compartments are located on each side and in front of the recess and have lockable lids. The side storage compartments have removable trays for access to the fifth wheel hook up. There is an optional storage tray which can be installed below the ramp and be slidably removed from the bed cover.

A principal object of the invention is to provide, for pickup trucks having a fifth wheel attachment, a truck bed cover that facilitates the alignment, engagement, and mounting of a trailer hitch to a fifth wheel.

Another object of the invention is to provide, for pickup trucks having a fifth wheel attachment, a truck bed cover that facilitates the disengagement and removal of a trailer hitch or the like from a fifth wheel.

Another object of the invention is to provide protection of a fifth wheel attachment in a pickup truck bed against theft.

Another object of the invention is to provide a truck bed cover that is substantially waterproof to prevent water leakage into the truck bed.

Another object is to provide a truck bed cover which has a low profile and allows an unobstructed view from rear of the vehicle.

Another object is to provide a truck bed cover that is lightweight and can be easily installed onto and removed from the bed of a pickup truck.

Yet another object is to provide a truck bed cover having multiple lockable storage compartments.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
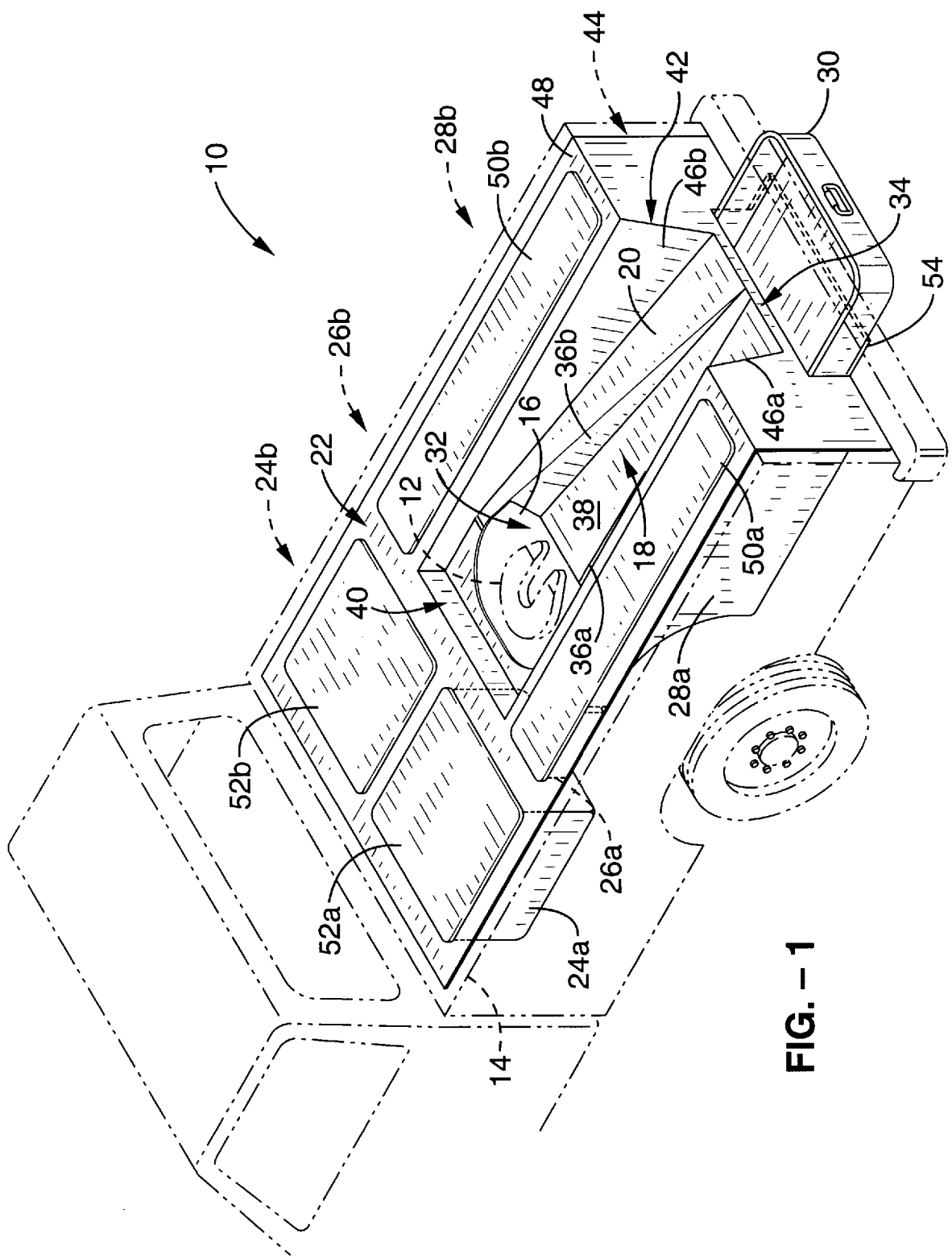
FIG. 1 is a perspective view of a fifth wheel receptacle valley pickup truck bed cover apparatus in accordance with the present invention installed in a pickup truck bed shown in phantom.
Figure 2:
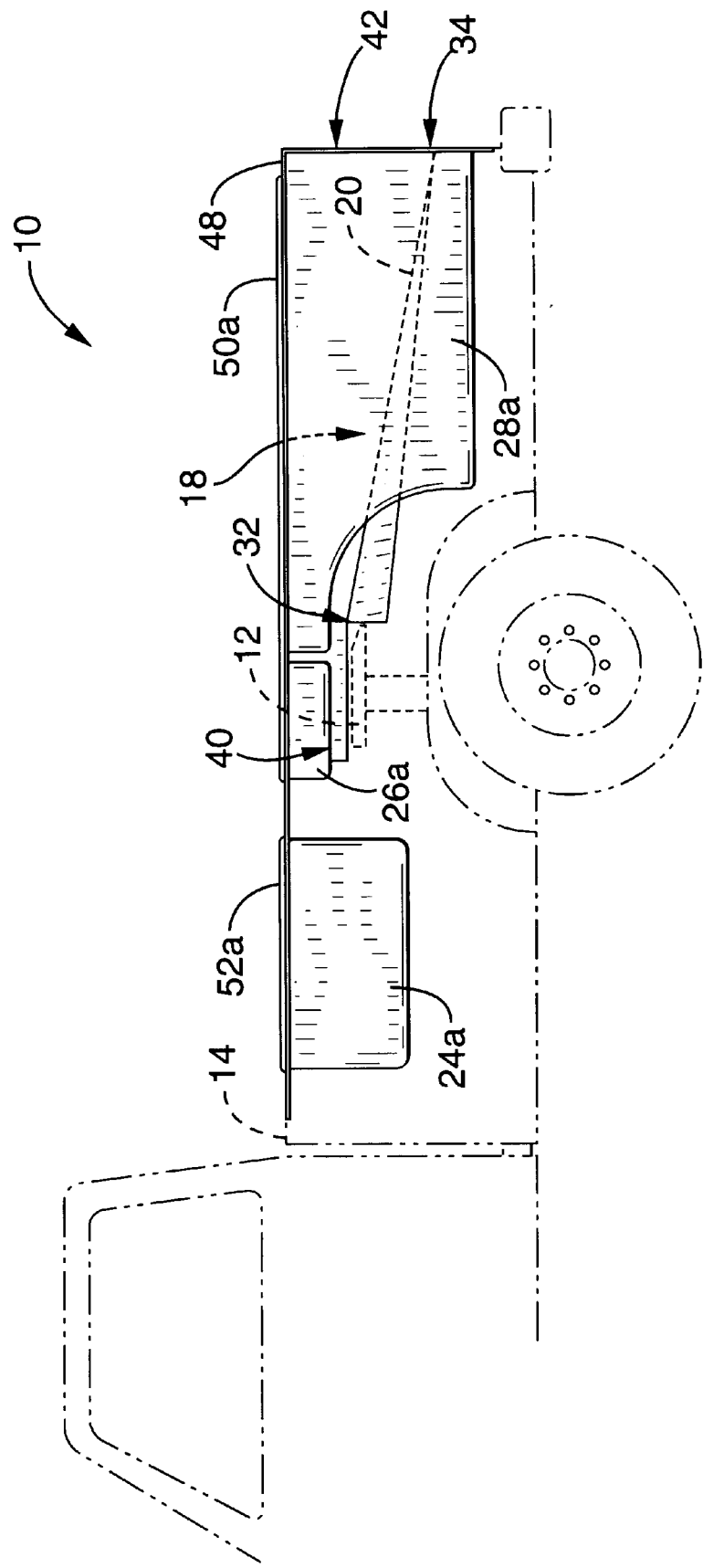
FIG. 2 is a side elevation view of the apparatus shown in FIG. 1.
Figure 3:
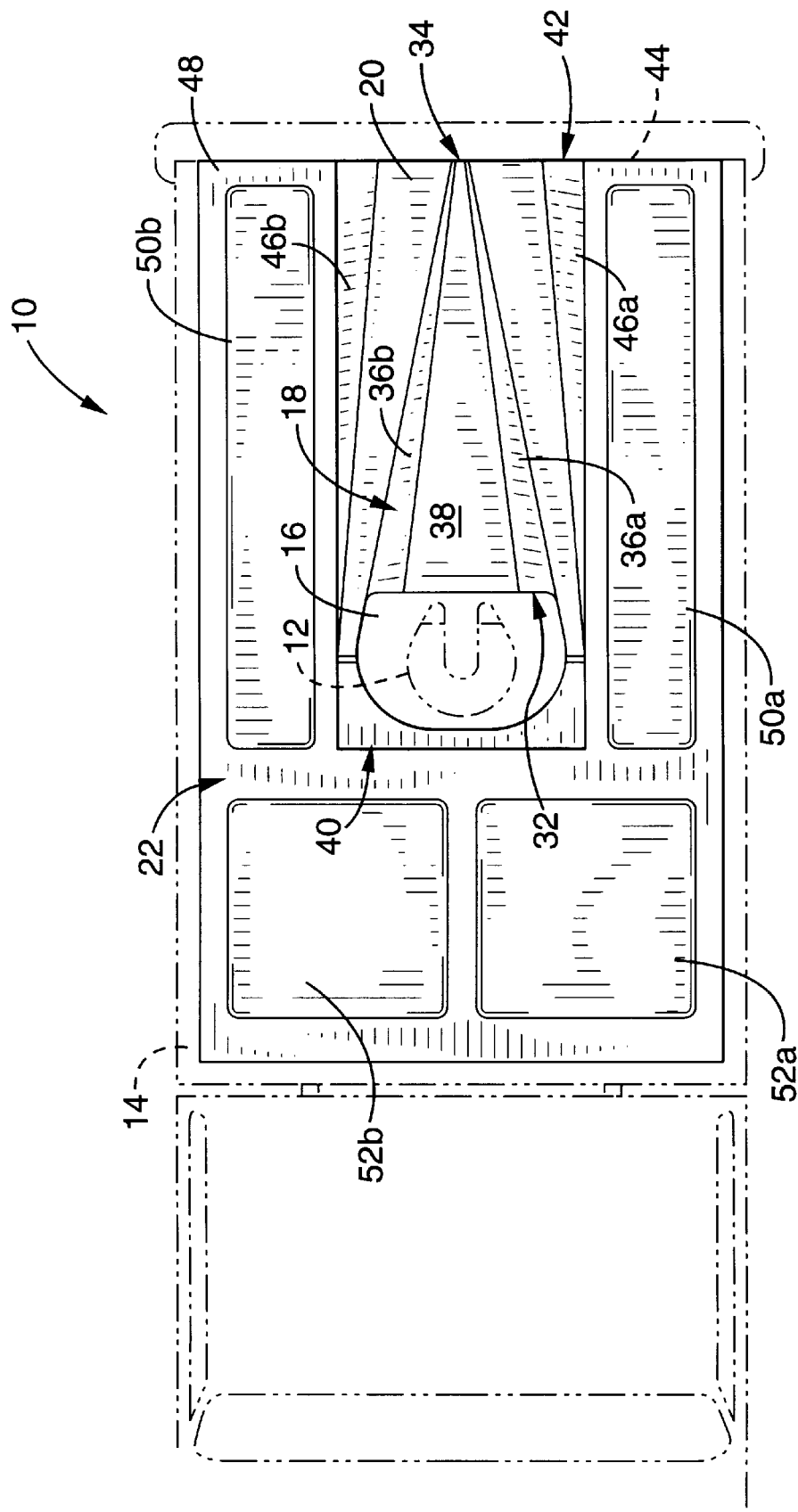
FIG. 3 is a top plan view of the apparatus shown in FIG. 1.

Referring more specifically to the drawings, for illustrative purposes the present invention is embodied in the apparatus generally shown in FIG. 1 through FIG. 3 where like reference numbers denote like parts. It will be appreciated that the apparatus may vary as to configuration and as to details of the parts without departing from the basic concepts as disclosed herein.

FIG. 1 generally depicts a fifth wheel receptacle valley on a pickup truck bed cover apparatus 10 in accordance with the present invention. The apparatus 10 is designed primarily for use on a pickup truck having a fifth wheel 12 attached to the truck bed 14 as depicted in phantom lines. The apparatus 10 generally comprises a recess 16, a wheel valley 18, a ramp 20, surrounding structure 22, matching left front 24a and right front 24b storage compartments, left intermediate 26a and right intermediate 26b storage compartments, left rear 28a and right rear 28b storage compartments, and a slide out tray 30.

Referring also to FIG. 2 and FIG. 3, the recess 16 provides access to a fifth wheel 12 mounted onto the bed 14. The wheel valley 18, which has a proximate end 32 and a distal end 34, extends rearwardly from the recess 16 with the proximate end 32 interfacing with the recess 16 and forming a continuous path from the recess 16 to the distal end 34. The wheel valley 18 has a pair of opposing side walls 36a,b and a bottom surface 38. The side surfaces 36a,b taper from the proximate end 32 to the distal end 34 and also from top to bottom terminating at the bottom surface 38. The wheel valley 18 inclines upward from the distal end 34 to the proximate end 32 as shown. As a result, a king pin or like attachment means can enter the wheel valley 18 adjacent to distal end 34, slide up into the recess 16 and engage the fifth wheel 12. The combination of the tapered side walls 36a,b and the inclined bottom surface 38 of wheel valley 18 serve to guide the king pin or like attachment means from the opening 34 to the recess 16 where the fifth wheel 12 is located. The wheel valley 18 also serves to alleviate inadvertent contact of the king pin or like attachment means with surrounding structure 22 during the fifth wheel engagement process or removal process thereby avoiding damage caused by such contact.

It can be seen that the wheel valley 18 is located within the ramp 20. The ramp 20 extends continuously from a front end 40 to a rear end 42 and is oriented such that the rear end 42 is located at the rear opening 44 of the truck bed 14. The recess 16 is located adjacent the front end 40 of the ramp 20, and the distal end 34 of the wheel valley 18 is located adjacent the rear end 42 of the ramp 20. The ramp 20 inclines upward from the rear end 42 to the front end 40. The ramp 20 includes a pair of side walls 46a,b which taper from top to bottom. The combination of the tapered side walls 46a,b and the inclined ramp 20 also serve to guide the king pin or like attachment means in the event the king pin or like attachment means deviates from the boundaries of the wheel valley 18 during the engagement or removal process.

The surrounding structure 22 of the truck bed cover apparatus 10 incorporates the ramp 20 and wheel valley 18, which is located within the ramp 20 as previously described. The surrounding structure 22 is sized to securely fit within a bed 14 of a pickup truck. Storage compartments 26a,b and 28a,b are located alongside the ramp 20. Each of the storage compartment 26a,b and 28a,b includes a removable storage tray (not shown) which resides below the deck 48 of the truck bed cover apparatus 10. Removal of the storage compartments 26a,b and 28a,b provides access to the fifth wheel hookup. Lids 50a,b fit over the storage compartments 26a,b and 28a,b as shown to provide a cover and/or locking means therefor. When fitted over the storage compartments 26a,b and 28a,b, the lids 50a,b preferably provide a waterproof seal.

The storage compartments 24a,b are located to the front of the ramp 20 and storage compartments 26a,b and 28a,b. The storage compartments 24a,b each have a pair of lids 52a,b which provide a cover and/or locking means therefor. When fitted over the storage compartments 24a,b, the lids 52a,b also preferably provide a waterproof seal to the storage compartments 24a,b.

The slide out tray 30 is located below the ramp 20 and accessible by opening a pull down door 54 or the like. Alternative, door 54 could be eliminated so that tray 30 is directly accessible.

In the preferred embodiment, the apparatus 10 is generally constructed of fiberglass. However, other types of material possessing similar structural characteristics may also be used to fabricate the apparatus 10.

Although the description above contains many specifics, these should not be construed as limiting the scope of the invention but as merely providing illustrations of some of the presently preferred embodiments of this invention. Thus the scope of this invention should be determined by the appended claims and their legal equivalents.

What is claimed is:

1. A pickup truck bed cover apparatus for use with pickups having a fifth wheel attachment mounted in the bed, comprising a cover assembly, said cover assembly including:

(a) a recess, said recess structured and configured to provide access to a fifth wheel attachment; and (b) a wheel valley, said wheel valley including a proximate end and a distal end, said proximate end contiguous to said recess;

(c) said wheel valley extending continuously and tapering from said proximate end to said distal end;

(d) said wheel valley structured and configured to receive an attachment means to said fifth wheel.

2. An apparatus as recited in claim 1, wherein said wheel valley includes a pair of opposing side walls, each said side wall having an upper end and a lower end, said side walls tapering from said upper end to said lower end.

3. An apparatus as recited in claim 1, further comprising:

(a) a ramp, said ramp including a front end and a rear end, said ramp extending continuously from said front end to said rear end;

(b) said recess located within said ramp adjacent said front end; and (c) said wheel valley located within said ramp, said distal end of said wheel valley located adjacent said rear end of said ramp.

4. An apparatus as recited in claim 3, wherein said ramp inclines upward from said rear end to said front end.

5. An apparatus as recited in claim 3, said ramp including a pair of opposing side walls, each said ramp side wall having a top end and a bottom end, said ramp side walls tapering from said top end to said bottom end.

6. An apparatus as recited in claim 3, wherein said cover assembly extends from and around said ramp, said cover assembly being structured and configured to fit within a pickup truck bed, and further comprising:

(a) a plurality of storage compartments, said storage compartments located within said cover assembly;

(b) a plurality of lids, said lids sized to cover said storage compartments; and (c) a slide out tray, said slide out tray located below said ramp.

7. A pickup truck bed cover apparatus for use with pickups having a fifth wheel attachment mounted in the bed, comprising a cover assembly, said cover assembly including:

(a) a recess, said recess capable of providing access to a fifth wheel attachment;

(b) a wheel valley, said wheel valley including a proximate end and a distal end, said distal end including an opening, said opening sized to receive an attachment means to said fifth wheel;

(c) said proximate end contiguous to said recess, said wheel valley extending continuously and tapering from said proximate end to said distal end; and (d) a ramp, said ramp including a front end and a rear end, said ramp extending continuously from said front end to said rear end, said recess located within said ramp adjacent said front end, said wheel valley located within said ramp, said distal end of said wheel valley located adjacent said rear end of said ramp.

8. An apparatus as recited in claim 7, said wheel valley including a pair of opposing side walls, each said side wall having an upper end and a lower end, said side walls tapering from said upper end to said lower end.

9. An apparatus as recited in claim 7, wherein said ramp inclines upward from said rear end to said front end.

10. An apparatus as recited in claim 7, said ramp including a pair of opposing side walls, each said side wall having a top end and a bottom end, said side walls tapering from said top end to said bottom end.

11. An apparatus as recited in claim 7, wherein said cover assembly extends from and around said ramp, said cover assembly being structured and configured to fit within a pickup truck bed, and further comprising:

(a) a plurality of storage compartments, said storage compartments located within said cover assembly;

(b) a plurality of lids, said lids sized to cover said storage compartments; and (c) a slide out tray, said slide out tray located below said ramp.

12. A pickup truck bed cover apparatus for use with pickups having a fifth wheel attachment mounted in the bed, comprising a cover assembly, said cover assembly including:

(a) a recess, said recess capable of providing access to a fifth wheel attachment;

(b) a wheel valley, said wheel valley including a proximate end and a distal end, said distal end including an opening, said opening sized to receive an attachment means to said fifth wheel;

(c) said proximate end contiguous to said recess, said wheel valley extending continuously and tapering from said proximate end to said distal end; said wheel valley including an upper end and a lower end, said wheel valley tapering from said upper end to said lower end; and (d) a ramp, said ramp including a front end and a rear end, said ramp extending continuously from said front end to said rear end, said recess located within said ramp adjacent said front end, said wheel valley located within said ramp, said distal end of said wheel valley located adjacent said rear end of said ramp.

13. An apparatus as recited in claim 12, wherein said ramp inclines upward from said rear end to said front end.

14. An apparatus as recited in claim 12, said ramp including a pair of opposing side walls, each said side wall having a top end and a bottom end, said side walls tapering from said top end to said bottom end.

15. An apparatus as recited in claim 12, wherein said cover assembly extends from and around said ramp, said cover assembly being structured and configured to fit within a pickup truck bed, and further comprising:

(a) a plurality of storage compartments, said storage compartments located within said cover assembly;

(b) a plurality of lids, said lids sized to cover said storage compartments; and (c) a slide out tray, said slide out tray located below said ramp.

* * * * *